(12) United States Patent
Lee

(10) Patent No.: US 6,661,536 B1
(45) Date of Patent: Dec. 9, 2003

(54) APPARATUS AND METHOD FOR STOPPING PRINT OPERATION UPON RECEPTION AND COPY OF SEQUENTIAL BLACK DATA IN FACSIMILE SYSTEM

(75) Inventor: Gang-Bock Lee, Goomi (KR)

(73) Assignee: Samsung Electronics Co., Ltd., Suwon (KR)

( * ) Notice: Subject to any disclaimer, the term of this patent is extended or adjusted under 35 U.S.C. 154(b) by 882 days.

(21) Appl. No.: 08/648,386

(22) Filed: May 15, 1996

(30) Foreign Application Priority Data

May 17, 1995 (KR) ............................. 95/12272

(51) Int. Cl.⁷ .................. H04N 1/00; H04N 1/40; H04N 1/32
(52) U.S. Cl. .................. 358/434; 358/404; 358/444; 358/437; 358/401; 358/468
(58) Field of Search ................. 358/434, 437, 358/468, 401, 440, 405, 444, 404

(56) References Cited

U.S. PATENT DOCUMENTS

| 4,947,345 | A | * | 8/1990 | Paradise et al. ............ 358/442 |
| 4,992,884 | A | * | 2/1991 | Sakata ........................ 358/401 |
| 5,019,916 | A | * | 5/1991 | Ogura ......................... 358/401 |
| 5,335,085 | A | * | 8/1994 | Nakatsuma .................. 358/404 |
| 5,420,693 | A | * | 5/1995 | Horiuchi et al. ............ 358/433 |
| 5,493,421 | A | * | 2/1996 | Uetama et al. ............. 358/468 |

\* cited by examiner

*Primary Examiner*—Cheukfan Lee
(74) *Attorney, Agent, or Firm*—Robert E. Bushnell, Esq.

(57) ABSTRACT

An apparatus and method for performing a protocol upon receiving a ring signal to thereby receive facsimile transmitted image data, storing the received image data in a memory, and when image data read out from the memory is black data over a predetermined number of lines, stopping a print operation and displaying a print stop message.

31 Claims, 4 Drawing Sheets

(PRINT STOP MESSAGE)

TRANSMITTING TEL NO:

RECEIVED TOTAL PAGE:

PRINT REJECTION PAGE:

RECEPTION DATA:

FIG.3

APPARATUS AND METHOD FOR STOPPING PRINT OPERATION UPON RECEPTION AND COPY OF SEQUENTIAL BLACK DATA IN FACSIMILE SYSTEM

CROSS REFERENCE TO RELATED APPLICATIONS

This application makes reference to, incorporates the same herein, and claims all benefits accruing under 35 U.S.C §119 from an application entitled Method Of Stopping Print Operation Upon Reception And Copy Of Sequential Black Data In Facsimile System earlier filed in the Korean Industrial Property Office on May 17, 1995, which was duly assigned Serial No. 12272/1995 by that Office.

FIELD OF THE INVENTION

The present invention relates to an apparatus and method for stopping a print operation upon reception and copy of black data, and particularly to a method of stopping a print operation when black data is sequentially received in excess of a designated line number during the reception or copy reproduction of image data.

BACKGROUND OF THE INVENTION

Conventionally in general facsimile systems, a print operation is performed by receiving image data according to a protocol, which are rules for the interaction of transmitting and receiving units of communications equipment, that are usually implemented through the programming of the data terminal equipment involved rather than being built into the hardware, after a ring signal is detected, or by scanning a document on a document tray upon input of a copy key. In a plain paper facsimile system printing image data onto cut sheets of a printable medium such as paper, a developing unit including an expendable organic photosensitive OPC drum, and a toner hopper supplying toner are designed to be exchanged when they are used in excess of a predetermined limit of use. When by mistake a document is reversely transmitted, i.e., when the back of the document is transmitted, or copied, due to a user's error, and when a substantial portion of the back surface of the document bears a dark color, the receiving party's facsimile system will sequentially print black image data and thus the received document will be printed substantially entirely in black. Accordingly, I have found that toner is excessively consumed during printing and as a result, the quickly depleted toner hopper has to be exchanged earlier than expected Accordingly, I have discovered that there are some disadvantages in conventional facsimile units because the lifetime of the expendable element is shortened, thereby increasing the cost of maintenance and repair, and image data that is subsequently transmitted can not be received after the toner hopper has been depleted of toner.

SUMMARY OF THE INVENTION

Accordingly, it is an object of the present invention to provide an improved facsimile telecommunications unit.

It is another object to provide an apparatus and process for stopping a printing operation when black data is sequentially received beyond a predetermined number of lines, upon reception of, or copy reproduction of, image data.

It is yet another object to provide a circuit and process for controlling a facsimile telecommunications unit to detect and terminate printing of image data that is substantially or completely devoid of information.

It is still another object to provide a circuit and process for minimizing consumption of toner by a facsimile telecommunications unit while printing image data that is substantially or completely devoid of information.

To achieve these and other objects, the present invention contemplates a circuit and a process for controlling operation of a facsimile telecommunications unit by performing a protocol upon reception of a ring signal to thereby receive facsimile transmitted image data, storing the received image data in a memory, and when image data read from the memory indicates the printing of substantially only black data consecutively over a predetermined number of adjoining lines, stopping a printing operation and displaying a visual message indicating the termination of printing operation.

Additionally, to achieve these and other objects, the present invention contemplates an apparatus and process for scanning image data of a document upon input of a copy key, storing the scanned image data in a memory, and when image data read from the memory represents substantially black data consequently over a predetermined number of adjoining lines, stopping the printing operation and displaying a visual message indicating the interruption of the printing operation.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein:

FIG. 3 is a view showing an output state of a visual print stop message generated in accordance with the principles of the present invention.

DETAILED DESCRIPTION OF THE PREFERRED EMBODIMENT

Figure 1:
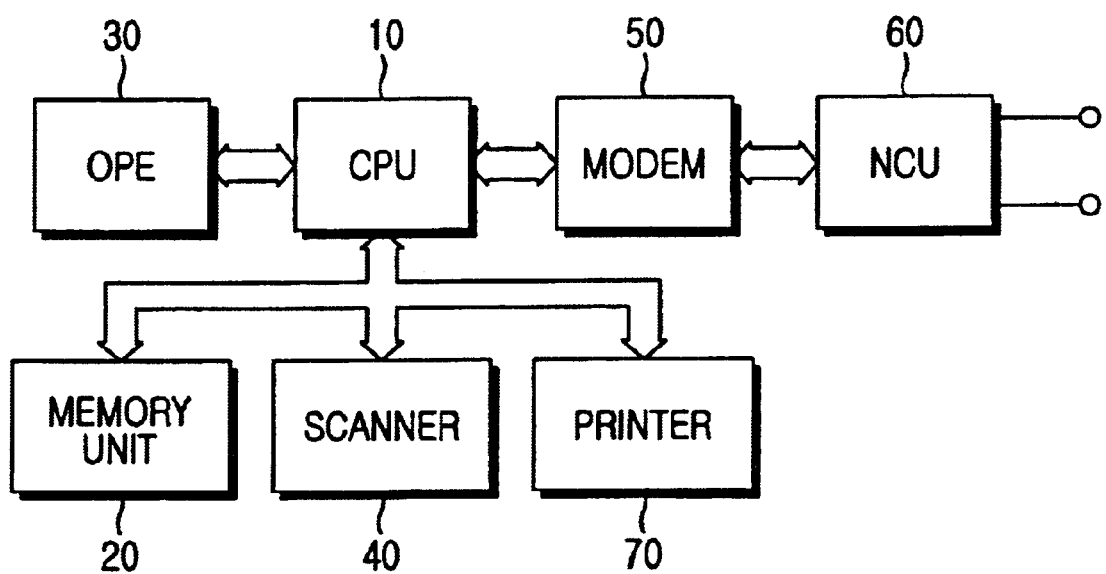
FIG. 1 is a block diagram illustrating the structure of a facsimile system constructed in accordance with the principles of the present invention.

Referring now to FIG. 1, the structure of the facsimile system constructed in accordance with the principles of the present invention is shown. As may be seen from FIG. 1, the facsimile and copying system is a circuit constructed with a central processing unit CPU 10, a memory unit 20 such as a read only memory and a randomly accessible memory that are not separately shown, an operations control panel OPE 30, a scanner 40, a modem 50, a network control unit NCU 60, and a printer 70. Central processing unit 10 controls the facsimile and copying system according to a given program, and accordingly, when substantially continuous black data over a predetermined number of adjoining lines is sequentially provided upon reception of, or for a reproduction copy of, image data, the facsimile and copying system interrupts and stops a printing operation under control of central processing unit 10. Memory 20, in which a program for stopping the printing operation, when image data of a document is printed as protocol data or black data over a sequential predetermined number of lines, is stored and data is accessed or stored under control of central processing unit 10. Operation panel 30 uses a plurality of keys for generating various key data, such as a dial key, copy key and function setting key, etc., and a displaying device for displaying data. Scanner 40 scans an image of the document, converts the scanned image data into digital image data, and then provides the digital image data to central processing unit 10. Modem 50 is controlled by central processing unit 10, modulates output data of central processing unit 10 into analog data, and demodulates received analog data into digital data. Network control unit 60 operates according to the control of central processing unit 10 to thereby form a speech loop of a telephone line, and serves as an interface accommodating signals of modem 50 and signals of the telephone line. Printer 70 prints received data according to the control signal of central processing unit 10.

Figure 2:
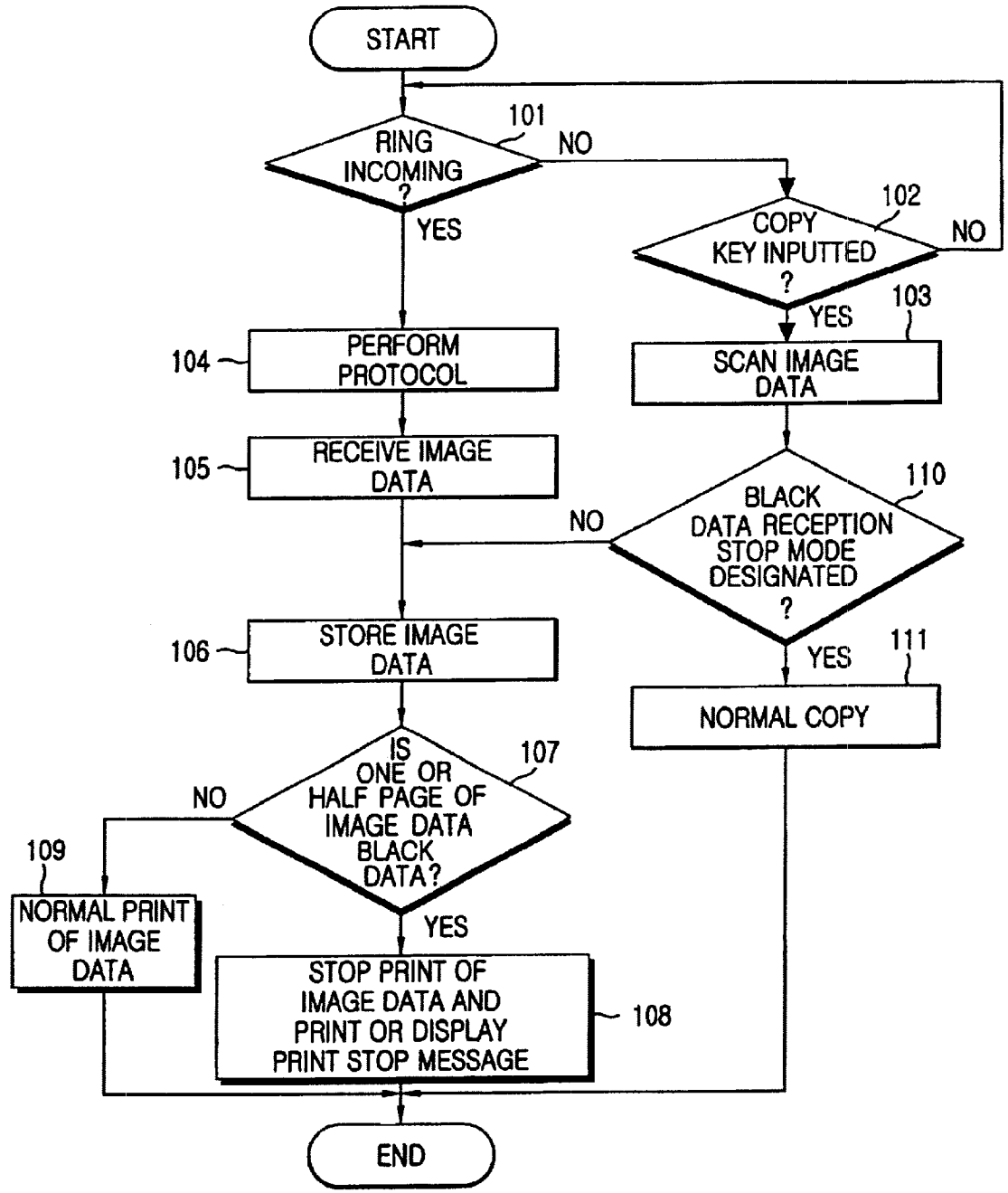
FIG. 2 is a flow chart illustrating control operations for stopping a printing operation upon reception of black data in accordance with one embodiment of the present invention.

FIG. 2 is a flow chart illustrating control operations for stopping a print operation upon reception of black data in accordance with a first embodiment of the present invention. As shown in FIG. 2, the control process has steps of performing selected customary protocols to receive facsimile transmitted image data in response to a received ring signal, or scanning image data of a document in response to activation of copy key, storing received image data or scanned image data in the memory, and when image data read from the memory is substantially or completely only black data over a sequential predetermined number of lines, stopping the print operation and displaying a print stop message.

FIG. 3 shows an output state of a visual print stop message that is generated in accordance with the practice of the present invention. With reference to FIGS. 1 through 3, one exemplary embodiment of the present invention will be explained, as follows, in detail.

First, central processing unit 10 determines whether a ring signal has been detected in a ring detection unit (not shown) of network control unit 60 in step 101 and when no ring signal is detected, proceeds to step 102. In step 102, central processing 10 detects whether a copy key (not shown) of a key input unit (not shown) on operation panel 30 is activated. When the copy key is not activated, step 101 is repeated. When the copy key is activated, central processing unit 10 drives scanner 40 and the image on the document to be copied is scanned in step 103, and simultaneously, central processing unit 10 detects, step 110, whether a black data reception stop mode has been designated by an input from a black data reception stop mode key (not shown) from the key input unit of operation panel 30. When central processing unit 10 determines that the black data reception stop mode has not been designated, the normal copy operation, step 111, is performed. When central processing unit 10 determines in step 110 that the black data reception stop mode has been designated, the scanned image data is stored, step 106, in memory unit 20.

When central processing unit 10 determines a ring signal has been detected in the ring detection unit of network control unit 60 in step 101, central processing unit 10 performs predetermined protocol operations in step 104. After the protocol operations have been performed, facsimile transmitted image data is received, step 105, and stored, step 106, in memory unit 20.

Following step 106 of storing received or copied image data in memory unit 20, central processing unit 10 detects whether a sequential predetermined number of lines, i.e., a whole page or half a page of stored image data, is black data, step 107. Here, black data is intended to be detected by page unit (e.g., one page or a half page), but it can be detected by line unit (e.g., 3 lines, 5 lines, or more). When central processing unit 10 determines in step 107 that the number of adjoining, uninterrupted lines of black data stored in memory unit 20 is not more than the predetermined number of lines, the image data is read from memory unit 20 and provided to printer 70 to be printed at step 109, in a normal printing operation. On the other hand, when central processing unit 10 determines in step 107 that the number of adjoining, uninterrupted lines of black data stored in memory unit 20 is more than the predetermined number of lines, central processing unit 10 proceeds to step 108. In step 108, central processing unit 10 controls printer 70 not to print image data, and prints or visually displays the print stop message, as shown in FIG. 3, through printer 70 or a visual display unit of operational panel 30.

Figure 4:
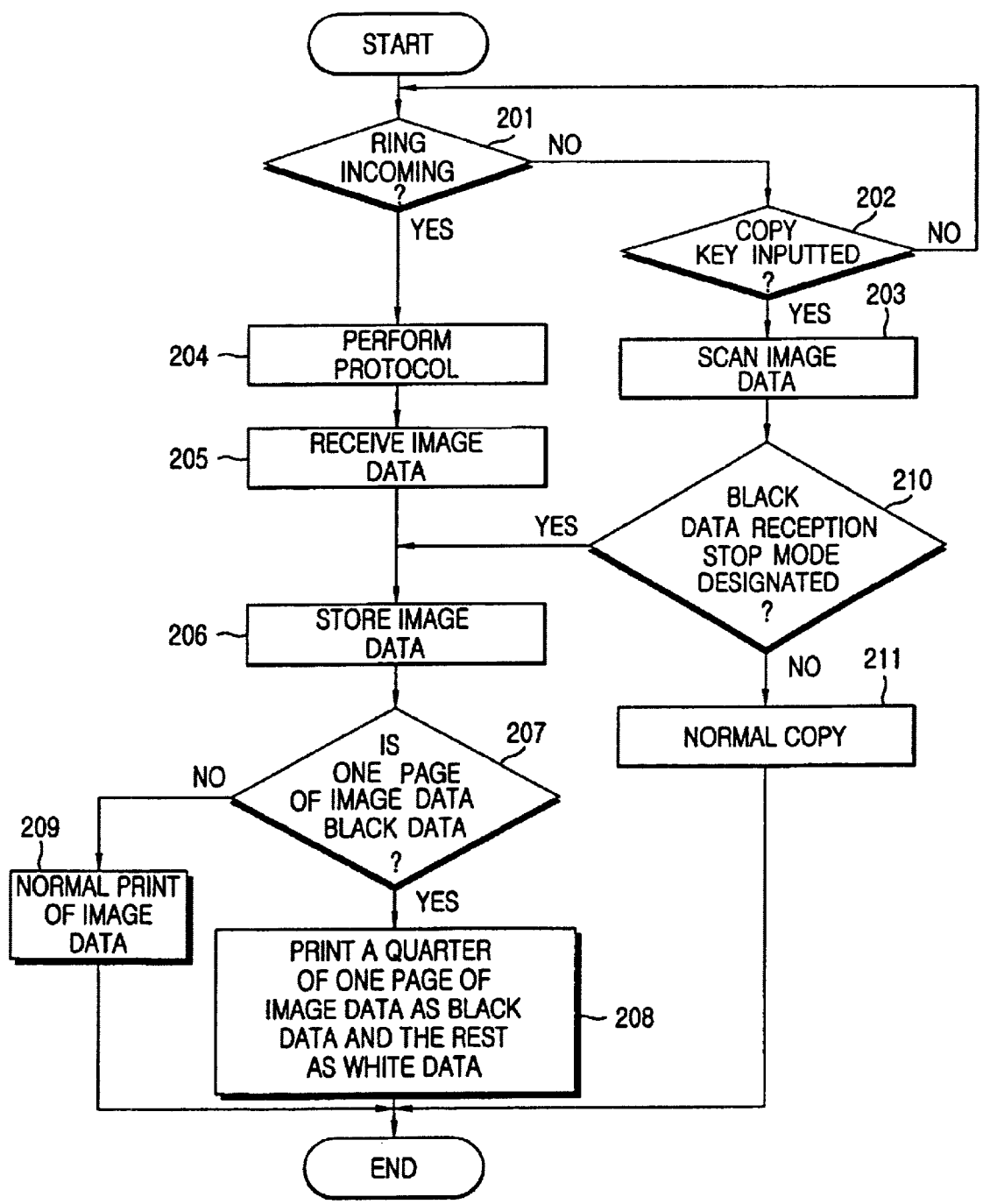
FIG. 4 is a flow chart illustrating control operations for stopping a printing operation upon reception of black data in accordance with another embodiment of the present invention.

FIG. 4 shows the flow chart illustrating a control operations for stopping the print operation upon reception of black data in accordance with a second embodiment of the present invention. As may be seen from FIG. 4, the control process comprises the steps of performing protocols to receive facsimile transmitted image data in response to a received ring signal, or scanning image data of a document in response to activation of copy key, storing received image data or scanned image data in the memory, and when image data read out from the memory is black data over a sequential predetermined number of lines, printing a given number of lines of image data in one page of image data as black data and the rest as white data.

With reference to FIGS. 1, 3 and 4, the preferred embodiment of the present invention will be explained, as follows, in detail.

First, central processing unit 10 determines whether a ring signal has been detected in a ring detection unit (not shown) of network control unit 60 in step 201 and when no ring signal is detected, proceeds to step 202. In step 202, central processing 10 detects whether a copy key (not shown) of a key input unit (not shown) on operation panel 30 is activated. When the copy key is not activated step 201 is repeated. When the copy key is activated, central processing unit 10 drives scanner 40 and the image on the document to be copied is scanned in step 203, and simultaneously, central processing unit 10 detects in step 210 whether a black data reception stop mode has been designated by an input from a black data reception stop mode key (not shown) from the key input unit of operation panel 30. When central processing unit 10 determines that the black data reception stop mode has not been designated, the normal copy operation, step 211, is performed. When central processing unit 10 determines that the black data reception stop mode has been designated in step 210, the scanned image data is stored, step 206, in memory unit 20.

When central processing unit 10 determines a ring signal has been detected in the ring detection unit of network control unit 60 in step 201, central processing unit 10 performs predetermined protocol operations in step 204. After the protocol operations have been performed, facsimile transmitted image data is received, step 205, and stored, step 206, in memory unit 20.

Following step 206 of storing received or copied image data in memory unit 20, central processing unit 10 detects, step 207, whether a sequential predetermined number of lines, i.e., a whole page or half a page of stored image data, is black data. Here, black data is intended to be detected by page unit (e.g., one page), but it can be detected by line unit (e.g., 3 lines, 5 lines, or more). When central processing unit 10 determines that the number of lines of black data stored in memory unit 20 is not more than the predetermined number of lines, the image data is read from memory unit 20 and provided to printer 70 to be printed, step 209, in a normal printing operation. On the other hand, when central processing unit 10 determines in step 207 that the number of lines of black data stored in memory unit 20 is more than the predetermined number of lines, central processing unit 10 proceeds to step 208. In step 208, central processing unit 10 controls printer 70 to print image data corresponding to a quarter of one page of stored image data as black data and the rest as white data.

In this facsimile system, and method therefor, as described above, when received image data contains more than a sequential predetermined number of adjoining lines of black data during either a copy operation or facsimile reception operation, a print operation of image data is ended and a print stop message is printed or displayed. Therefore, there is an advantage of preventing unnecessary waste of toner or paper due to undesired printing of a whole page of data as a result of operational error or error of the facsimile system. Furthermore, when received image data contains more than the predetermined number of lines of black data, image data corresponding to a given number of lines, e.g. a quarter of a page, is printed as black data and the rest of the page of image data is printed as white data. Therefore, there is an advantage in that the lifetime of the expendable element, i.e., photosensitive drum or developing unit, is extended by preventing toner waste and accordingly, the cost of the maintenance or repairing can be reduced in the plain paper facsimile system.

It is understood that various other modifications will be apparent to and can be readily made by those skilled in the art without departing from the scope and spirit of this invention. For example, since it is known to store an image in memory in order to perform a delayed facsimile transmission, then the present invention can be used to prevent a facsimile transmission when a predetermined number of sequential lines of image data stored in memory are determined to be black data. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A method of stopping a print operation in a facsimile system, said method comprising the steps of:
   determining whether a ring signal has been received;
   performing a protocol when said step of determining determines that said ring signal has been received to receive facsimile transmitted image data;
   storing said image data in a memory;
   determining whether the stored image data contains a predetermined number of sequential lines of black data; and
   stopping the print operation and displaying a print stop message, when said predetermined number of sequential lines of black data has been determined to have been stored in said memory.

2. The method as set forth in claim 1, further comprising a step of printing said print stop message.

3. The method as set forth in claim 1, further comprising the steps of:
   detecting activation of a copy key when said step of determining whether a ring signal has been received determines that said ring signal has not been received; and
   returning to said step of determining whether a ring signal has been received when no activation of said copy key has been detected.

4. The method as set forth in claim 3, further comprising the steps of:
   scanning image data on a document to be copied when activation of said copy key has been detected;
   determining whether a black data reception stop mode has been activated while scanning said image data on said document; and
   printing the image data scanned during said scanning step when said black data reception stop mode has not been activated.

5. The method as set forth in claim 3, further comprising the steps of:
   scanning image data on a document to be copied when activation of said copy key has been detected;
   determining whether a black data reception stop mode has been activated while scanning said image data on said document;
   storing the image data scanned during said scanning step when said black data reception stop mode has been activated;
   determining whether the stored image data contains a predetermined number of sequential lines of black data; and
   stopping the print operation and displaying a print stop message, when said predetermined number of sequential lines of black data has been determined to have been stored in said memory.

6. The method as set forth in claim 4, further comprising the steps of:
   storing the image data scanned during said scanning step when said black data reception stop mode has been activated;
   determining whether the stored image data contains a predetermined number of sequential lines of black data; and
   stopping the print operation and displaying a print stop message, when said predetermined number of sequential lines of black data has been determined to have been stored in said memory.

7. The method as set forth in claim 1, said step of determining whether the stored image data contains a predetermined number of sequential lines of black data comprises determining whether the predetermined number of sequential lines of black data is at least equal to half a page of lines.

8. The method as set forth in claim 1, said step of determining whether the stored image data contains a predetermined number of sequential lines of black data comprises determining whether the predetermined number of sequential lines of black data is equal to a whole page of adjoining lines.

9. The method as set forth in claim 1, further comprising the step of:
   printing the image data stored in said memory when it is determined that the stored image data does not contain said predetermined number of sequential lines of black data.

10. A method of stopping a print operation in a facsimile system, said method comprising the steps of:

determining whether a ring signal has been received;

detecting activation of a copy key when said step of determining whether a ring signal has been received determines that said ring signal has not been received;

scanning image data on a document to be copied when activation of said copy key has been detected;

determining whether a black data reception stop mode has been activated while scanning said image data on said document;

storing the image data scanned during said scanning step in a memory when said black data reception stop mode has been activated;

determining whether the stored image data contains a predetermined number of sequential lines of black data; and stopping the print operation and displaying a print stop message, when said predetermined number of sequential lines of black data has been determined to have been stored in said memory.

11. The method as set forth in claim 10, further comprising a step of printing said print stop message.

12. The method as set forth in claim 10, further comprising the steps of:

returning to said step of determining whether a ring signal has been received when no activation of said copy key has been detected.

13. The method as set forth in claim 12, further comprising the steps of:

performing a protocol when said ring signal has been received to receive facsimile transmitted image data;

storing received image data in said memory;

determining whether the stored image data contains a predetermined number of sequential lines of black data; and stopping the print operation and displaying a print stop message, when said predetermined number of sequential lines of black data has been determined to have been stored in said memory.

14. The method as set forth in claim 10, further comprising the step of:

printing the image data scanned during said scanning step when said black data reception stop mode has not been activated.

15. The method as set forth in claim 10, further comprising the steps of:

performing a protocol when said ring signal has been received to receive facsimile transmitted image data;

storing received image data in said memory;

determining whether the stored image data contains a predetermined number of sequential lines of black data; and stopping the print operation and displaying a print stop message, when said predetermined number of sequential lines of black data has been determined to have been stored in said memory.

16. The method as set forth in claim 10, further comprising the step of:

printing the image data stored in said memory when it is determined that the stored image data does not contain said predetermined number of sequential lines of black data.

17. A method of stopping a print operation in a facsimile system, said method comprising the steps of:

determining whether a ring signal has been received;

detecting activation of a copy key when said step of determining whether a ring signal has been received determines that said ring signal has not been received;

scanning image data on a document to be copied when activation of said copy key has been detected;

determining whether a black data reception stop mode has been activated while scanning said image data on said document;

printing the image data scanned during said scanning step when said black data reception stop mode has not been activated.

18. The method as set forth in claim 17, further comprising the step of:

storing the image data scanned during said scanning step in a memory when said black data reception stop mode has been activated;

determining whether the stored image data contains a predetermined number of sequential lines of black data; and printing a plurality of lines of image data stored in said memory as black data and the rest of the lines of image data stored in said memory as white data, when said predetermined number of sequential lines of black data has been determined to have been stored in said memory.

19. The method as set forth in claim 18, said step of printing a plurality of lines of image data stored in said memory as black data comprises printing a quarter of a page of lines as black data.

20. The method as set forth in claim 17, further comprising the steps of:

returning to said step of determining whether a ring signal has been received when no activation of said copy key has been detected.

21. The method as set forth in claim 20, further comprising the steps of:

performing a protocol when said ring signal has been received to receive facsimile transmitted image data;

storing received image data in said memory;

determining whether the stored image data contains a predetermined number of sequential lines of black data; and printing a plurality of lines of image data stored in said memory as black data and the rest of the lines of image data stored in said memory as white data, when said predetermined number of sequential lines of black data has been determined to have been stored in said memory.

22. The method as set forth in claim 20, further comprising the steps of:

printing the image data stored in said memory when it is determined that the stored image data does not contain said predetermined number of sequential lines of black data.

23. The method as set forth in claim 17, further comprising the steps of:

performing a protocol when said ring signal has been received to receive facsimile transmitted image data;

storing received image data in said memory;

determining whether the stored image data contains a predetermined number of sequential lines of black data; and printing a plurality of lines of image data stored in said memory as black data and the rest of the lines of image data stored in said memory as white data, when said predetermined number of sequential lines of black data has been determined to have been stored in said memory.

24. A facsimile apparatus for controlling a print operation, said facsimile apparatus comprising:

network control means for detecting a ring signal transmitted over a telephone line;

central processing means for determining when said network control means detects said ring signal;

operation panel means having a copy mode key, a black data reception stop mode key and a display means;

said central processing means determining when said copy mode key has been activated when said network control means does not detect a ring signal;

scanning means for scanning a document and generating scanned image data when said central processing means determines said copy mode key has been activated;

said central processing means determining whether said black data reception stop mode key has been activated while said scanning means scans said document;

memory means for storing image data, said memory means storing said scanned image data when said central processing means determines that said black data reception stop mode key has been activated;

print means for printing said scanned image data when said central processing means determines that said black data reception stop mode key has not been activated;

said central processing means determining whether said memory means contains a predetermined number of sequential lines of black data; and said central processing means controlling said print means for preventing said print means from performing a normal print operation when said predetermined number of sequential lines of black data has been determined to have been stored in said memory.

25. The facsimile apparatus as set forth in claim 24, further comprising:

said central processing means performing a protocol, when said central processing means determines that said network control means has detected said ring signal, to receive facsimile transmitted image data;

said memory means storing said facsimile transmitted image data;

said central processing means determining whether said memory means contains a predetermined number of sequential lines of black data; and said central processing means controlling said print means for preventing said print means from performing a normal print operation when said predetermined number of sequential lines of black data has been determined to have been stored in said memory means.

26. The apparatus as set forth in claim 25, further comprising:

said central processing means controlling said print means to perform a normal print operation by printing the facsimile transmitted image data stored in said memory means, when said predetermined number of sequential lines of black data has been determined to have been stored in said memory means.

27. The apparatus as set forth in claim 25, said central processing means controlling said print means for preventing said print means from performing a normal print operation by controlling said print means to print a plurality of lines of said facsimile transmitted image data, stored in said memory means, as black data and to print the rest of the lines of facsimile transmitted image data, stored in said memory means, as white data.

28. The apparatus as set forth in claim 24, further comprising:

said central processing means controlling said print means for preventing said print means from performing a normal print operation by stopping a print operation; and said control processing means providing a print stop message to said display means for display.

29. The apparatus as set forth in claim 24, further comprising:

said central processing means controlling said print means for preventing said print means from performing a normal print operation by stopping a print operation; and said control processing means providing a print stop message to said print means for printing.

30. The apparatus as set forth in claim 24, further comprising:

said central processing means controlling said print means to perform a normal print operation by printing the scanned image data stored in said memory means, when said predetermined number of sequential lines of black data has been determined not to have been stored in said memory.

31. The apparatus as set forth in claim 24, said central processing means controlling said print means for preventing said print means from performing a normal print operation by controlling said print means to print a plurality of lines of said scanned image data, stored in said memory means, as black data and to print the rest of the lines of scanned image data, stored in said memory means, as white data.

* * * * *